United States Patent [19]
Benedeti

[11] Patent Number: 5,813,583
[45] Date of Patent: Sep. 29, 1998

[54] PORTABLE CD HOLDER

[76] Inventor: Paulo Benedeti, 7519 La Paz Blvd., #407, Boca Raton, Fla. 33433

[21] Appl. No.: 947,514

[22] Filed: Oct. 10, 1997

[51] Int. Cl.$^6$ .................................................. B60R 11/02
[52] U.S. Cl. .......................... 224/483; 224/554; 224/564; 224/901.8; 224/929; 248/205.2; 248/295.11; 108/45
[58] Field of Search .................................. 224/483, 539, 224/545, 548, 550, 551, 555, 557, 564, 565, 567, 901.8, 929; 248/205.2, 295.11, 300; 455/345, 346; 108/44, 45

[56] References Cited

U.S. PATENT DOCUMENTS

| | | | |
|---|---|---|---|
| 2,510,436 | 6/1950 | Trammel | 108/45 |
| 2,635,680 | 4/1953 | Zentmire | 108/45 |
| 2,778,700 | 1/1957 | Mayer | 108/45 |
| 2,829,779 | 4/1958 | Weddington | 108/45 |
| 3,280,765 | 10/1966 | Storms | 108/45 |
| 4,648,572 | 3/1987 | Sokol | 248/205.2 |
| 4,762,258 | 8/1988 | Murphy | 224/901.8 |
| 5,065,922 | 11/1991 | Harris | 224/901.8 |

Primary Examiner—Allan N. Shoap
Assistant Examiner—Gregory M. Vidovich

[57] ABSTRACT

A new portable CD holder for holding a portable compact disc player for use in a motor vehicle. The inventive device includes a bracket arrangement adapted for securement to an underside of a dashboard of a vehicle below a radio thereof. A pair of circular hook and loop patches are provided. One of the hook and loop patches is secured to the bracket arrangement. One of the hook and loop patches is secured to an underside of a portable CD player. The pair of hook and loop patches secure the portable CD player to the bracket arrangement.

5 Claims, 2 Drawing Sheets

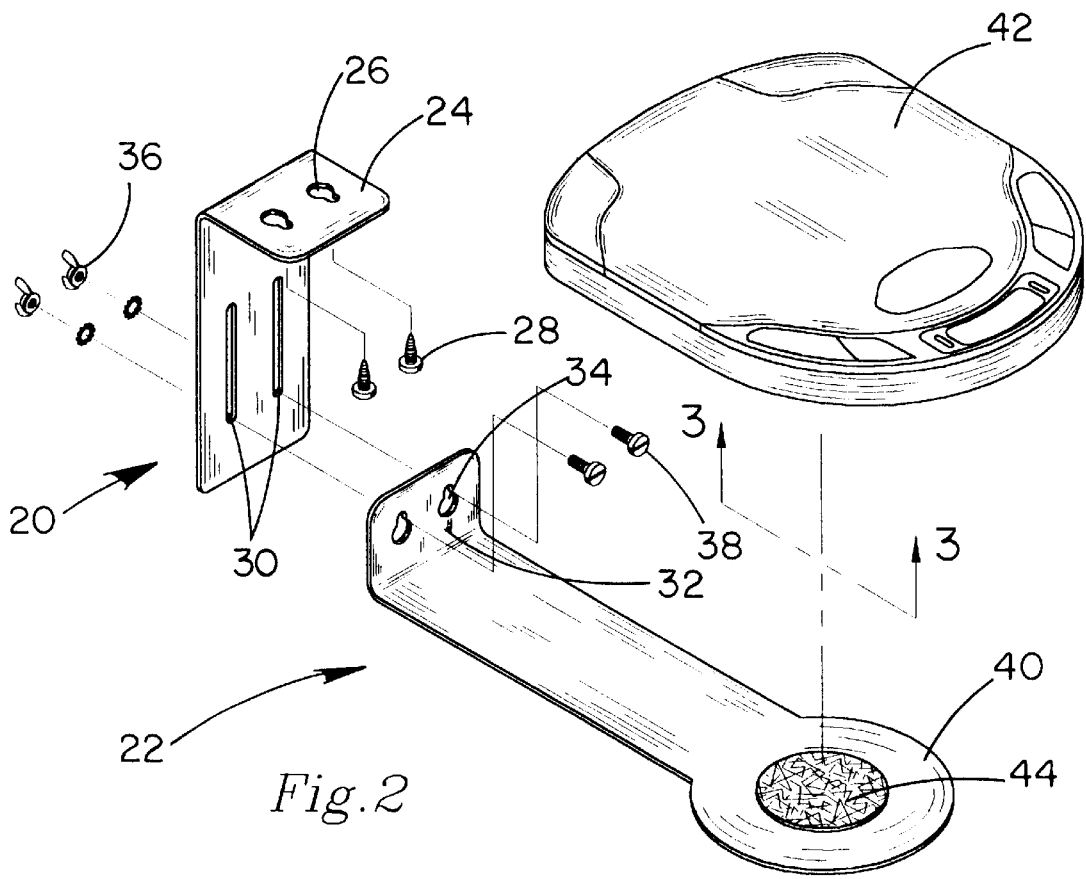
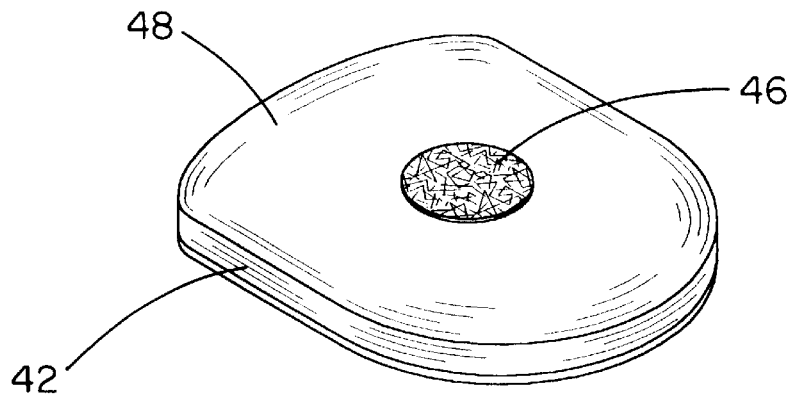

PORTABLE CD HOLDER

BACKGROUND OF THE INVENTION

1. Field of the Invention

The present invention relates to radio mounts and more particularly pertains to a new portable CD holder for holding a portable compact disc player for use in a motor vehicle.

2. Description of the Prior Art

The use of radio mounts is known in the prior art. More specifically, radio mounts heretofore devised and utilized are known to consist basically of familiar, expected and obvious structural configurations, notwithstanding the myriad of designs encompassed by the crowded prior art which have been developed for the fulfillment of countless objectives and requirements.

Known prior art radio mounts include U. S. Pat. No. 4,796,849 to Fouassier; U.S. Pat. No. 5,054,011 to Alves; U.S. Pat. No. Des. 340,723 to Halligan; U.S. Pat. No. 4,981,243 to Rogowski; U.S. Pat. No. 4,083,620 to Burgin; and U.S. Pat. No. 4,061,971 to Barrons.

While these devices fulfill their respective, particular objectives and requirements, the aforementioned patents do not disclose a new portable CD holder. The inventive device includes a bracket arrangement adapted for securement to an underside of a dashboard of a vehicle below a radio thereof. A pair of circular hook and loop patches are provided. One of the hook and loop patches is secured to the bracket arrangement. One of the hook and loop patches is secured to an underside of a portable CD player. The pair of hook and loop patches secure the portable CD player to the bracket arrangement.

In these respects, the portable CD holder according to the present invention substantially departs from the conventional concepts and designs of the prior art, and in so doing provides an apparatus primarily developed for the purpose of holding a portable compact disc player for use in a motor vehicle.

SUMMARY OF THE INVENTION

In view of the foregoing disadvantages inherent in the known types of radio mounts now present in the prior art, the present invention provides a new portable CD holder construction wherein the same can be utilized for holding a portable compact disc player for use in a motor vehicle.

The general purpose of the present invention, which will be described subsequently in greater detail, is to provide a new portable CD holder apparatus and method which has many of the advantages of the radio mounts mentioned heretofore and many novel features that result in a new portable CD holder which is not anticipated, rendered obvious, suggested, or even implied by any of the prior art radio mounts, either alone or in any combination thereof.

To attain this, the present invention generally comprises a bracket arrangement adapted for securement to an underside of a dashboard of a vehicle below a radio thereof. The bracket arrangement includes an upper vertical component and a lower horizontal component. The upper vertical component has a tab portion extending inwardly from an upper end thereof. The tab portion has a pair of apertures therethrough. The tab portion is positionable on the underside of the dashboard below the radio and receives a pair of screws therethrough for securement to the underside of the dashboard. The upper vertical component has a pair of vertically disposed elongated slots therethrough. The lower horizontal component has a lower tab portion extending upwardly from an inner end thereof. The lower tab portion has a pair of apertures therethrough. The lower tab portion is positionable against the upper vertical component with the pair of apertures aligning with the elongated slots for securement therewith by a pair of nuts and bolts. The lower horizontal component has a circular mounting pad extending outwardly from an outer end thereof. The circular mounting pad has a diameter less than that of a standard portable CD player. A pair of circular hook and loop patches are provided. One of the hook and loop patches is secured to the circular mounting pad. One of the hook and loop patches is secured to an underside of a portable CD player. The pair of hook and loop patches secure the portable CD player to the circular mounting pad.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new portable CD holder apparatus and method which has many of the advantages of the radio mounts mentioned heretofore and many novel features that result in a new portable CD holder which is not anticipated, rendered obvious, suggested, or even implied by any of the prior art radio mounts, either alone or in any combination thereof.

It is another object of the present invention to provide a new portable CD holder which may be easily and efficiently manufactured and marketed.

It is a further object of the present invention to provide a new portable CD holder which is of a durable and reliable construction.

An even further object of the present invention is to provide a new portable CD holder which is susceptible of a low cost of manufacture with regard to both materials and labor, and which accordingly is then susceptible of low prices of sale to the consuming public, thereby making such portable CD holder economically available to the buying public.

Still yet another object of the present invention is to provide a new portable CD holder which provides in the apparatuses and methods of the prior art some of the advantages thereof, while simultaneously overcoming some of the disadvantages normally associated therewith.

Still another object of the present invention is to provide a new portable CD holder for holding a portable compact disc player for use in a motor vehicle.

Yet another object of the present invention is to provide a new portable CD holder which includes a bracket arrangement adapted for securement to an underside of a dashboard of a vehicle below a radio thereof. A pair of circular hook and loop patches are provided. One of the hook and loop patches is secured to the bracket arrangement. One of the hook and loop patches is secured to an underside of a portable CD player. The pair of hook and loop patches secure the portable CD player to the bracket arrangement.

Still yet another object of the present invention is to provide a new portable CD holder that prevents skips or jumps while a CD is playing.

Even still another object of the present invention is to provide a new portable CD holder that can be mounted in a vehicle and allows the CD player to be easily removed therefrom.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is an exploded perspective view of the present invention.

FIG. 3 is a bottom view of the CD player of the present invention as taken along line 3—3 of FIG. 2.

DESCRIPTION OF THE PREFERRED EMBODIMENT

Figure 1:
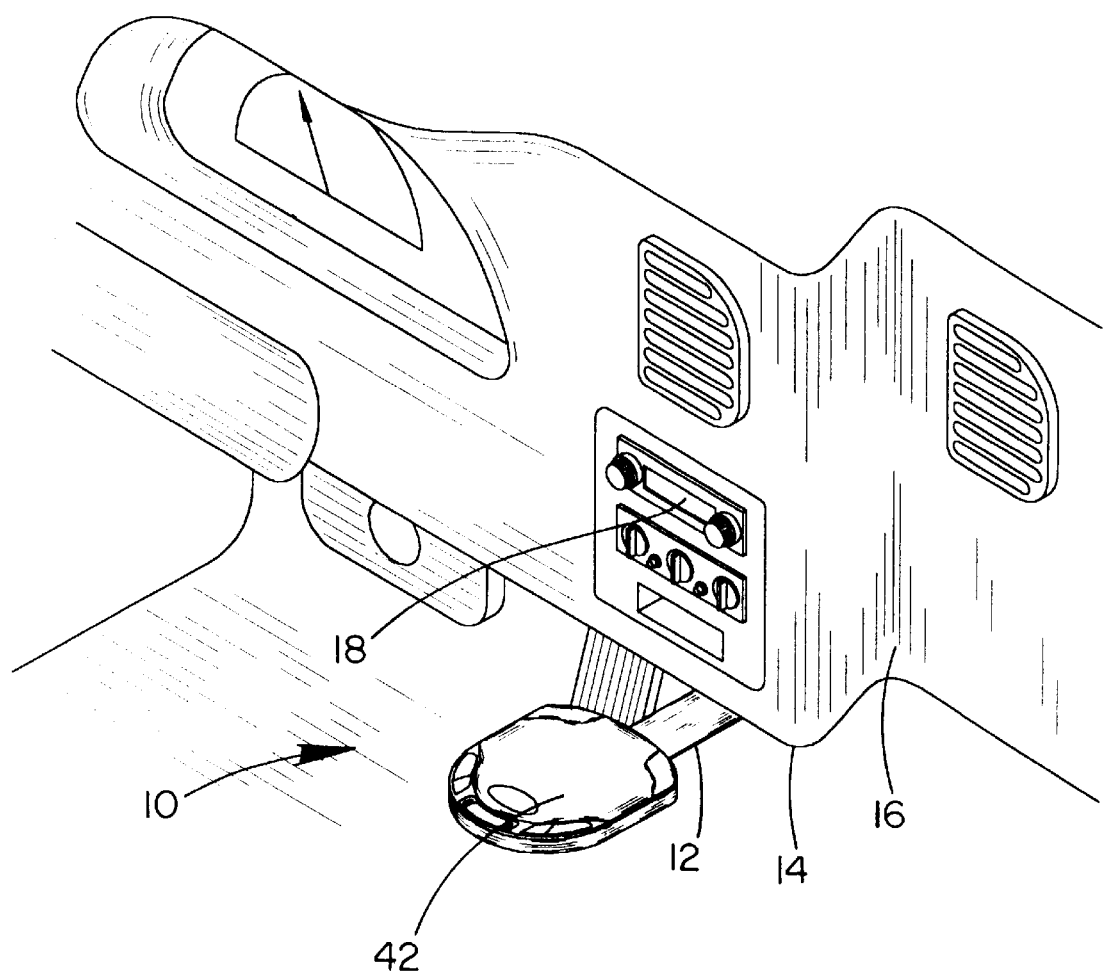
FIG. 1 is a perspective view of a new portable CD holder according to the present invention.

With reference now to the drawings, and in particular to FIGS. 1 through 3 thereof, a new portable CD holder embodying the principles and concepts of the present invention and generally designated by the reference numeral 10 will be described.

As best illustrated in FIGS. 1 through 3, the portable CD holder 10 comprises a bracket arrangement 12 adapted for securement to an underside 14 of a dashboard 16 of a vehicle below a radio 18 thereof. The bracket arrangement 12 includes an upper vertical component 20 and a lower horizontal component 22. The upper vertical component 20 has a tab portion 24 extending inwardly from an upper end thereof. The tab portion 24 has a pair of apertures 26 therethrough. The tab portion 26 is positionable on the underside 14 of the dashboard 16 below the radio 18 and receives a pair of screws 28 therethrough for securement to the underside 14 of the dashboard 16. The upper vertical component 20 has a pair of vertically disposed elongated slots 30 therethrough. The lower horizontal component 22 has a lower tab portion 32 extending upwardly from an inner end thereof. The lower tab portion 32 has a pair of apertures 34 therethrough. The lower tab portion 32 is positionable against the upper vertical component 20 with the pair of apertures 34 aligning with the elongated slots 30 for securement therewith by a pair of nuts 36 and bolts 38. The lower horizontal component 22 has a circular mounting pad 40 extending outwardly from an outer end thereof. The circular mounting pad 40 has a diameter less than that of a standard portable CD player 42.

A pair of circular hook and loop patches are provided. One of the hook and loop patches 44 is secured to the circular mounting pad 40. One of the hook and loop patches 46 is secured to an underside 48 of a portable CD player 42. The pair of hook and loop patches 44,46 secure the portable CD player 42 to the circular mounting pad 40.

In use, the bracket assembly 12 is easily mounted in a vehicle for holding a portable CD player 42 while using it within the vehicle. The hook and loop patches 44,46 would firmly affix the CD player 42 to the bracket assembly 12 when it is being used within the vehicle, but would still allow it to be easily removed from the vehicle when the user desired.

The present invention would be made from slightly flexible plastic or steel material and would measure approximately eight inches long by three inches wide by four inches high. The design would incorporate the circular mounting pad 40 which can support the portable CD player 42 thereon. The lower horizontal component 20, which is thinner as compared with the circular mounting pad 40, forms a shock absorbing arm, thus cushioning the portable CD player 42 and prevent skipping or jumping, which can be caused by taking turns, traveling up and down hills, or hitting bumps on the road.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A new portable CD holder for holding a portable compact disc player for use in a motor vehicle comprising, in combination:

a bracket arrangement adapted for securement to an underside of a dashboard of a vehicle below a radio thereof, the bracket arrangement including an upper vertical component and a lower horizontal component, the upper vertical component having a tab portion extending inwardly from an upper end thereof, the tab portion having a pair of apertures therethrough, the tab portion positionable on the underside of the dashboard below the radio and receiving a pair of screws therethrough for securement to the underside of the dashboard, the upper vertical component having a pair of vertically disposed elongated slots therethrough, the lower horizontal component having a lower tab portion extending upwardly from an inner end thereof, the lower tab portion having a pair of apertures therethrough, the lower tab portion positionable against the upper vertical component with the pair of apertures aligning with the elongated slots for securement therewith by a pair of nuts and bolts, the lower horizontal component having a circular mounting pad extending outwardly from an outer end thereof, the circular mounting pad having a diameter less than that of a standard portable CD player; and a pair of circular hook and loop patches, one of the hook and loop patches secured to the circular mounting pad, the other one of the hook and loop patches being securable to an underside of a portable CD player, the pair of hook and loop patches securing the portable CD player to the circular mounting pad.

2. A new portable CD holder for holding a portable compact disc player for use in a motor vehicle comprising, in combination:

a bracket arrangement adapted for securement to an underside of a dashboard of a vehicle below a radio thereof; and a pair of hook and loop patches, one of the hook and loop patches being securable to the bracket arrangement, the other one of the hook and loop patches secured to an underside of a portable CD player, the pair of hook and loop patches securing the portable CD player to the bracket arrangement wherein the bracket arrangement includes an upper vertical component configured for securement to the underside of the vehicle dashboard and a lower horizontally disposed component coupled at an inner end thereof to the vertical component, the lower horizontal component further having a horizontally disposed mounting pad extending outwardly from an outer end thereof which is opposite said inner end, the mounting pad having one of the hook and loop patches disposed thereon for securement with the portable CD player, the mounting pad further having an outer periphery which is less than an outer periphery of the portable CD player such that the outer periphery of the portable CD player extends beyond the outer periphery of the mounting pad when secured thereto.

3. The portable CD holder as set forth in claim 2 wherein the upper vertical component has a tab portion securable to the underside of the dashboard.

4. The portable CD holder as set forth in claim 2 wherein the lower horizontal component is adjustable coupled with the upper vertical component.

5. The portable CD holder as set forth in claim 2 wherein the mounting pad is circular.

\* \* \* \* \*